United States Patent [19]
Maus et al.

[11] Patent Number: 5,173,267
[45] Date of Patent: Dec. 22, 1992

[54] CATALYST WITH A DOUBLE CASING SYSTEM

[75] Inventors: Wolfgang Maus, Bergisch Gladbach; Ludwig Wieres, Overath; Rainer Sahler, Köln, all of Fed. Rep. of Germany

[73] Assignee: Emitec Gesellschaft Für Emissionstechnologie mbH, Lohmar, Fed. Rep. of Germany

[21] Appl. No.: 684,689

[22] Filed: Apr. 11, 1991

Related U.S. Application Data

[63] Continuation of PCT/EP89/01134, Sep. 27, 1989.

[30] Foreign Application Priority Data

Oct. 11, 1988 [DE] Fed. Rep. of Germany ... 8812762[U]

[51] Int. Cl.$^5$ .............................................. F01N 3/28
[52] U.S. Cl. ................................. 422/179; 422/180; 422/221; 422/222; 60/299; 60/322; 55/DIG. 30
[58] Field of Search ............... 422/179, 177, 180, 190, 422/193, 211, 221, 222, 239, 171; 60/299, 301, 322; 55/DIG. 30

[56] References Cited

U.S. PATENT DOCUMENTS

| | | | |
|---|---|---|---|
| 4,072,471 | 2/1978 | Morgan, Jr. et al. | 422/171 |
| 4,158,037 | 6/1979 | Aoyama | 422/179 |
| 4,160,010 | 7/1979 | Öttle | 422/180 |
| 4,235,846 | 11/1980 | Abthoff et al. | 422/171 |
| 4,775,518 | 10/1988 | Abthoff et al. | 422/179 |
| 4,976,103 | 12/1990 | Takikawa et al. | 60/299 |

FOREIGN PATENT DOCUMENTS

| | | |
|---|---|---|
| 0177479 | 4/1986 | European Pat. Off. . |
| 0314129 | 5/1989 | European Pat. Off. . |
| 0212243 | 7/1989 | European Pat. Off. . |
| 0245737 | 8/1989 | European Pat. Off. . |
| 0336115 | 10/1989 | European Pat. Off. . |
| 8812762 | 8/1989 | Fed. Rep. of Germany . |
| 0731005 | 4/1980 | U.S.S.R. ............... 422/176 |

*Primary Examiner*—Lynn M. Kummert
*Attorney, Agent, or Firm*—Herbert L. Lerner; Laurence A. Greenberg

[57] ABSTRACT

An encased catalyst, especially for motor vehicles, includes at least one metal honeycomb catalyst carrier body through which exhaust gas can pass. At least one inner jacket tube carries the at least one catalyst carrier body. An outer jacket tube approximately concentrically surrounds the at least one inner jacket tube at a distance. The at least one inner jacket tube and the outer jacket tube have end regions and are firmly joined together in one of the end regions. The at least one inner jacket tube is freely longitudinally expandable in the outer jacket tube.

39 Claims, 2 Drawing Sheets

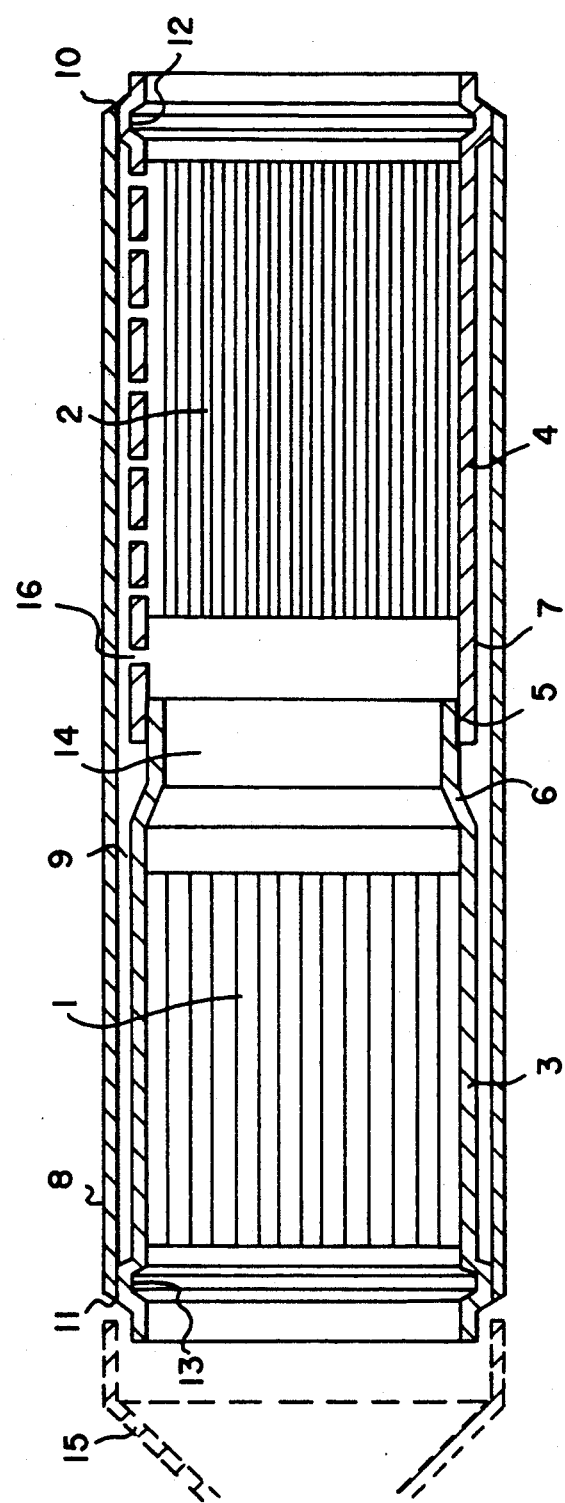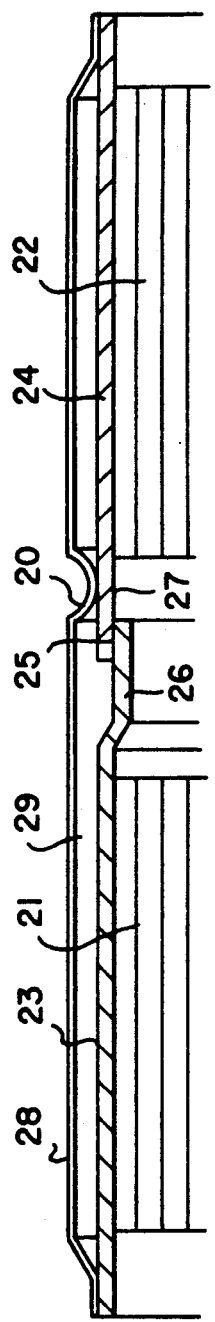
FIG.1
FIG.2

CATALYST WITH A DOUBLE CASING SYSTEM

CROSS-REFERENCE TO RELATED APPLICATION

This application is a Continuation of International Application Ser. No. PCT/EP89/01134, filed Sept. 27, 1989.

The invention relates to an encased catalyst, in particular for motor vehicles, which includes at least one metal honeycomb-like catalyst carrier body through which exhaust gas can pass, and a jacket tube supporting the catalyst carrier body.

Metal catalyst carrier bodies are known in numerous forms, such as that disclosed in European Patent No. 0 245 737 B1, corresponding to U.S. Pat. Nos. 4,832,998 and 4,923,109. For instance, they may be assembled from steel sheets or manufactured by powder metallurgy techniques. A particularly significant factor in the durability of such a body is the control of mechanical strains arising from alternating thermal loads in such a configuration. Such control can be provided either by means of shaping or by means of a particular kind of casing. European Patent No. 0 212 243 B1, corresponding to U.S. Pat. No. 4,795,615 describes a retainer for a catalyst carrier body that allows strain-free longitudinal expansion of the catalyst carrier body. That configuration has only one jacket tube, which surrounds the catalyst carrier body concentrically with clearance.

In many forms of catalyst carrier bodies, such as that described in European Patent No. 0 245 737 B1, corresponding to U.S. Pat. Nos. 4,832,998 and 4,923,109, a jacket tube that directly encloses the actual honeycomb body and takes on its structure cannot be dispensed with. It is accordingly an object of the invention to provide a catalyst with a double casing system, which overcomes the hereinafore-mentioned disadvantages of the heretofore-known devices of this general type, which creates a casing for a catalyst that can be manufactured simply and at advantageous cost and which withstands alternating thermal strains even for large catalyst bodies having a volume of over 1 liter, for instance.

With the foregoing and other objects in view there is provided, in accordance with the invention, an encased catalyst, especially for motor vehicles, comprising at least one metal honeycomb catalyst carrier body through which exhaust gas can pass; at least one inner jacket tube carrying the at least one catalyst carrier body; an outer jacket tube approximately concentrically surrounding the at least one inner jacket tube at a distance; the at least one inner jacket tube and the outer jacket tube having end regions and being firmly joined together in one of the end regions; and the at least one inner jacket tube being freely longitudinally expandable in the outer jacket tube.

The inner jacket tube, which is provided for the sake of stability, is surrounded approximately concentrically by the outer jacket tube. A spacing of approximately 1 to 5 mm between the two jacket tubes is preferred. In one end region, the inner jacket tube is firmly joined to the end region of the outer jacket tube, preferably with a circumferential weld. The other end of the inner jacket tube protrudes freely into the interior of the outer jacket tube and can thus expand unhindered if the temperature rises. This type of casing has the following decisive advantages:

First, the inner jacket, since it need not bear the internal pressure, can be made very much thinner than a single jacket tube. For instance, it may be only 0.1 to 1 mm thick. As a result, and because of the additional outer casing acting as thermal insulation, the inner jacket tube can heat up faster along with the catalyst carrier body and can attain a higher temperature overall than if the outer jacket were lacking. This reduces the strains in the interior of the catalyst carrier body. Furthermore, the inner jacket tube is not exposed to any external influences, such as splashing water, so that no further consideration of such factors need be taken in selecting the material. For example, as in the features mentioned below, a ferritic material that is optimized for such use can therefore be used. The inner jacket tube also need not be made from a solid sheet, since it no longer performs any sealing functions. A perforated sheet can be used, which entails considerable economies in terms of weight and material. The type, shape and size of perforation is variable within wide limits. Preferably, however, sheets in which an area of approximately 50% is occupied by holes that are approximately 1 cm in size can be used.

In accordance with another feature of the invention, the inner jacket tube exceeds a certain axial length, in order to retain it in a sliding seat as well. This suppresses oscillation and avoids breakage due to vibration.

In accordance with a further feature of the invention, a sliding seat of this kind can be constructed, for instance, by continuous circumferential inner beads or individual inner beads in the outer jacket. Continuous circumferential inner beads simultaneously increase the stability of the outer jacket and affect its projection of sound, which may be advantageous for various applications.

In accordance with an added feature of the invention, the outer jacket tube takes on the task of sealing the entire configuration, securing the remaining exhaust system, and protecting against external influences, while the inner jacket tube serves solely to provide dimensional stability and retention of the actual catalyst carrier body. The outer jacket tube can preferably be made of austenitic material.

The proposed casing system is particularly advantageous whenever two catalyst carrier bodies are to be accommodated in one outer jacket tube. For various reasons, for instance in main catalysts in vehicles with the highest-capacity engines, it may be useful to fill a given volume of approximately 3 liters, with external dimensions of 10 to 15 cm, not with a single catalyst carrier body but rather with two or more disks disposed axially one after the other. On one hand, such disks are easier to manufacture, and on the other hand the spaces between such disks make it possible to make the exhaust gas turbulent and thus increase the conversion rate. It may also be useful to use disks of different axial lengths, with a different number of channels, and/or with different catalytically active coatings.

In accordance with an additional feature of the invention, the outer jacket tube is formed of austenitic material.

In accordance with yet another feature of the invention, the at least one inner jacket tube is formed of ferritic material.

In accordance with yet a further feature of the invention, the at least one inner jacket tube is perforated at least in some portions, and preferably has non-perforated end regions.

In accordance with yet an added feature of the invention, the at least one catalyst carrier body is a first catalyst carrier body, the at least one an inner jacket tube is a first inner jacket tube, and the end regions of the outer jacket tube are first and second end regions; and there is provided a second catalyst carrier body disposed approximately concentrically within the outer jacket tube, and a second inner jacket tube carrying the second catalyst carrier body and having end regions; one of the end regions of the first inner jacket tube being firmly joined to the first end region of the outer jacket tube; one of the end regions of the second inner jacket tube being firmly joined to the second end region of the outer jacket tube; and the other of the end regions of the first and second inner jacket tubes are retained in one another with a sliding seat and/or inside the outer jacket tube.

The above-described embodiment offers a good opportunity for placing two catalyst disks in one outer jacket tube. As will be described in detail in conjunction with the drawing, the two inner jacket tubes of the two catalyst disks are each secured at one end to both ends of the outer jacket tube, preferably by welding. The inner ends of the two inner jacket tubes, which can freely expand longitudinally, can be preferably telescoped in one another, with the first inner jacket tube being correspondingly tapered or the second inner jacket tube being correspondingly flared. The result is a sliding seat, which telescopes farther and farther into itself as the configuration increasingly warms up, so that in every operating state it assures reliable retention of both catalyst carrier bodies. As an alternative or additionally, sliding seats, which are provided, for instance, by means of inner beads, are also possible between the outer and inner jacket tubes.

In accordance with yet an additional feature of the invention, the first and second inner jacket tubes are formed of ferritic and/or perforated sheet metal.

In accordance with again another feature of the invention, the first and second catalyst carrier bodies have different axial lengths and/or a different number of channels per unit of cross-sectional area.

In accordance with again a further feature of the invention, the first and second catalyst carrier bodies are spaced apart defining a space therebetween for making the exhaust gases turbulent and for compensating for longitudinal expansions, the space preferably having an axial length between approximately 1 and 3 cm.

In accordance with again an added feature of the invention, the other of the end regions of the first an second inner jacket tubes are freely longitudinally expandable ends being guided in one another with a sliding seat, and preferably the other end region of the first inner jacket tube has a taper protruding several millimeters into the interior of the second inner jacket tube in a cold state.

In accordance with a concomitant feature of the invention, there are provided connecting pieces slipped onto the end regions of the entire configuration and joined to the outer jacket tube, preferably by butt-welding, and in particular one of the connecting pieces, the outer jacket tube and the at least one inner jacket tube are joined by a single continuous circumferential weld seam.

Finally, the double casing system described herein also makes it simple to incorporate the entire catalyst configuration into an exhaust system, because the usual connection pieces can be slipped onto the protruding inner jacket, such as at the ends, and welded to the outer jacket.

Other features which are considered as characteristic for the invention are set forth in the appended claims.

Although the invention is illustrated and described herein as embodied in a catalyst with a double casing system, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a fragmentary, diagrammatic, sectional view of a catalyst configuration being formed of two catalyst disks with a double casing system;

FIG. 2 is a fragmentary, sectional view of a variant of FIG. 1 with a different shaping of end regions and an additional inner bead in an outer jacket tube for support of an inner system;

Figure 3:
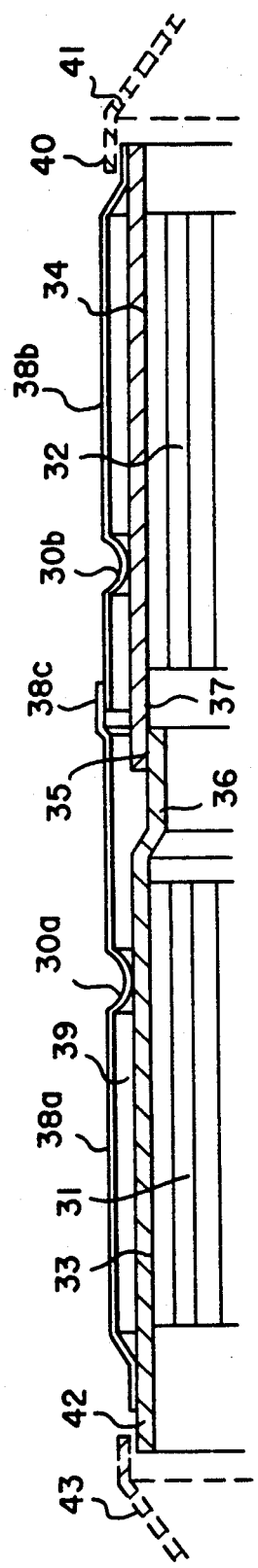
FIG. 3 is a fragmentary, sectional view of a further variant of the configuration of FIG. 1 with a two-part outer jacket, for configurations of great axial length.

Referring now to the figures of the drawings in detail and first, particularly, to FIG. 1 thereof, there is seen an illustration of the principle of the present invention in terms of a large-volume catalyst that is formed of two catalyst carrier bodies 1, 2. However, by leaving out one of the two catalyst bodies and correspondingly shortening an outer jacket tube 8 in FIG. 1, the essence of the present invention for use with one-piece catalysts, for instance as in FIG. 4, also becomes clear. The same is correspondingly true for FIGS. 2 and 3.

In FIG. 1, the catalyst configuration has a first metal honeycomb body 1 and a second metal honeycomb body 2, which are respectively surrounded by a first inner jacket tube 3 and a second inner jacket tube 4. Both ends of both inner jacket tubes 3, 4 protrude beyond the actual metal honeycomb bodies 1, 2. The inner protruding end of the first inner jacket tube 3 has a tapered collar 6, which protrudes into the interior of an inner collar 7 of the second inner jacket tube 4 and forms a sliding seat 5 therewith at that location. A mixing chamber 14 thus remains empty between the two honeycomb bodies 1, 2. The exhaust gases can mix again in the mixing chamber 14 after passing through the first metal honeycomb body 1. The outer end region of the first inner jacket tube 3 has a continuous circumferential outer bead 13, and the outer end region of the second inner jacket tube 4 likewise has a continuous circumferential outer bead 12.

The outer jacket tube 8 is slipped over the two outer beads 12, 13 onto the entire configuration and it is secured to the outer beads 12, 13 with circumferential welds 10, 11. The outer ends of the two inner jacket tubes 3, 4 protrude somewhat beyond the outer jacket tube 8, so that a connecting piece 15 (shown in broken lines) can be easily slipped onto the outer jacket tube until it meets it. A connection to a motor vehicle exhaust system can be provided without difficulty. Under some circumstances, the weld seams 10, 11 can even be used to simultaneously join the connecting pieces 15, the inner jacket tubes 3 and 4 and outer jacket tube 8. In addition it should be noted that FIG. 1 is not at all to scale but instead merely shows the basic construction of the configuration. In particular, the inner jacket tubes 3, 4 may be substantially thinner than the outer jacket tube 8. The mixing chamber 14 may also have a much smaller axial length than that shown in the drawing. The only important factor is that the dimensioning of the tapered collar 6 leaves enough play for the slipped-on collar 7 to provide for thermal expansion longitudinally of the two inner jacket tubes 3, 4. The honeycomb bodies 1, 2 may have different axial lengths and may have a different number of channels per unit of cross-sectional area.

Perforations 16 in the inner jacket tube 4, as provided in an embodiment of the invention, are indicated in the top right-hand corner of FIG. 1. Also, the honeycomb body 2 is shown with a greater number of flow channels than the honeycomb body 1.

As FIGS. 2 and 3 show, there are various options for joining the inner and outer jacket and for shaping the end regions of the configuration. Moreover, the honeycomb body or bodies may be supported by inner beads. Thus FIG. 2 shows two metal honeycomb bodies 21, 22 with inner jacket tubes 23, 24 thereof which are telescoped in one another by means of a tapered collar 26 and a protruding collar 27 as in FIG. 1, producing a sliding seat 25. In this exemplary embodiment, an outer jacket 28 has a continuous circumferential inner bead 20, which has a depth being equivalent to that of a space 29 between the outer and inner jacket systems. In catalyst configurations of relatively great axial length, such an inner bead 20 ca prevent oscillation of the honeycomb bodies 21, 22 without restricting their axial freedom of motion. The reduction in sound projection can have additional advantages.

FIG. 3 shows a catalyst configuration in which an outer jacket tube is formed of two parts 38a and 38b, which are joined together at a connection site 38c. The connection site 38c can, for instance, be in the form of a continuous circumferential butt-welded seam, but the two parts 38a, 38bcan also be telescoped in one another and then joined. The disposition of metal honeycomb bodies 31, 32 with first and second inner jacket tubes 33, 34 thereof is equivalent to the dispositions shown in FIGS. 1 and 2. In the present case, the outer jacket tube has continuous circumferential inner beads 30a, 30b, which support the two inner jacket tubes 33, 34. Once again, the collars 36, 37 of the two inner jacket tubes 33, 34 slide into one another with a sliding seat 35. FIG. 3 additionally shows two various possibilities for shaping the end regions of the double casing system. As shown on the left, a connection piece 43 can be slipped onto a protruding end 42 of the first inner jacket tube 33 until it strikes a tapered end of the outer jacket tube part 38a. As shown on the right, the second inner jacket tube 34 does not protrude beyond the outer jacket tube part 38b. However, at that location a connecting piece 41 can be slipped over a tapered end 40 of the outer jacket tube 38b and joined thereto. A useful feature in this case is that no weld seams can damage the outer layers of the catalyst. Other variants in terms of shaping the end regions of the configuration are possible. The configurations should generally be selected in such a way that the outer jacket tube and the connecting pieces surround the inner jacket tubes completely and tightly.

Figure 4:
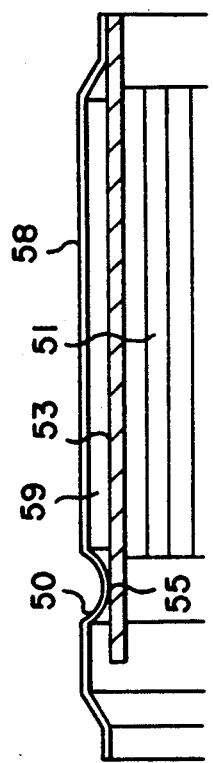
FIG. 4 is a fragmentary, sectional view showing a use of the invention for one-piece catalysts.

For the sake of completeness, FIG. 4 also shows an exemplary embodiment of the invention for one-piece catalysts. An inner jacket tube 53 of a metal honeycomb body 51 is firmly joined at one end surface to an outer jacket tube 58, while defining a space 59 between the two jacket tubes. A continuous circumferential inner bead 50 in the outer jacket tube 58 retains the other end of the inner jacket tube 53 in a sliding seat 55, so that the catalyst 51, with the inner jacket tube 53, is freely expandable longitudinally relative to the outer jacket tube 58.

The present catalysts with a double casing system are suitable as main catalysts in passenger cars, in particular for large volumes in the upper capacity class, which are subjected to heavy thermal loads during operation.

We claim:

1. A catalytic converter, comprising:
   a) at least one metal honeycomb catalyst carrier body through which exhaust gas can pass;
   b) at least one inner jacket tube having first and second end regions, said at least one catalyst carrier body being received in said at least one inner jacket tube;
   c) an outer jacket tube approximately concentrically surrounding said at least one inner jacket tube and having first and second end regions;
   d) said first end region of said at least one inner jacket tube being firmly joined to said first end region of said outer jacket tube;
   e) said at least one inner jacket tube being freely longitudinally expandable in said outer jacket tube; and
   f) a sliding seat contacting said second end region of said outer jacket tube, said second end region of said at least one inner jacket tube being retained in said sliding seat, said sliding seat being a continuous circumferential bead in said outer jacket tube.

2. The catalytic converter according to claim 1, wherein said at least one inner jacket tube includes at least one perforated portion.

3. The catalytic converter according to claim 1, wherein said at least one inner jacket tube has non-perforated end regions.

4. The catalytic converter according to claim 1, including connecting pieces slipped onto each of said first and second end regions of said outer jacket tube and joined to said outer jacket tube.

5. The catalytic converter according to claim 4, wherein said connecting pieces are joined to said outer jacket tube by butt-welding.

6. The catalytic converter according to claim 4, wherein one of said connecting pieces, said outer jacket tube and said at least one inner jacket tube are joined by a single continuous circumferential.

7. The catalytic converter according to claim 1, wherein said outer jacket tube and said at least one inner jacket tube are spaced apart by approximately 1 to 5 mm.

8. A catalytic converter, comprising:
   a) at least one metal honeycomb catalyst carrier body through which exhaust gas can pass;
   b) at least one inner jacket tube having first and second end regions, said at least one catalyst carrier body being received in said at least one inner jacket tube;
   c) an outer jacket tube approximately concentrically surrounding said at least one inner jacket tube and having first and second end regions;

d) said first end region of said at least one inner jacket tube being firmly joined to said first end region of said outer jacket tube;
e) said at least one inner jacket tube being freely longitudinally expandable in said outer jacket tube; and
f) a sliding seat contacting said second end region of said outer jacket tube, said second end region of said at least one inner jacket tube being retained in said sliding seat, wherein said sliding seat is formed of individual inner beads in said outer jacket tube.

9. A catalytic converter, comprising:
a) at least one metal honeycomb catalyst carrier body through which exhaust gas can pass;
b) at least one inner jacket tube having first and second end regions, said at least one catalyst carrier body being received in said at least one inner jacket tube;
c) an outer jacket tube approximately concentrically surrounding said at least one inner jacket tube and having first and second end regions;
d) said first end region of said at least one inner jacket tube being firmly joined to said first end region of said outer jacket tube;
e) said at least one inner jacket tube being freely longitudinally expandable in said outer jacket tube; and
f) a sliding seat contacting said second end region of said outer jacket tube, said second end region of said at least one inner jacket tube being retained in said sliding seat.

10. A catalytic converter, comprising:
a) at least one metal honeycomb catalyst carrier body through which exhaust gas can pass;
b) at least one inner jacket tube formed of ferritic material and having first and second end regions, said at least one catalyst carrier body being received in said at least one inner jacket tube;
c) an outer jacket tube approximately concentrically surrounding said at least one inner jacket tube and having first and second end regions;
d) said first end region of said at least one inner jacket tube being firmly joined to said first end region of said outer jacket tube;
e) said at least one inner jacket tube being freely longitudinally expandable in said outer jacket tube; and
f) a sliding seat contacting said second end region of said outer jacket tube, said second end region of said at least one inner jacket tube being retained in said sliding seat.

11. A catalytic converter, comprising:
a) a first and second inner jacket tubes each having first and second end regions, and a metal honeycomb catalyst carrier body through which exhaust gas can flow received therein;
b) an outer jacket tube approximately concentrically surrounding said first and second inner jacket tubes and having first and second end regions;
c) said first end region of said first inner jacket tube being firmly joined to said first end region of said outer jacket tube;
d) said first end region of said second inner jacket tube being firmly joined to said second end region of said outer jacket tube; and
e) said second end region of said first inner jacket tube and said second end region of said second inner jacket tube being retained one inside the other with a sliding seat for allowing longitudinal expansion of said first and second inner jacket tubes.

12. The catalytic converter according to claim 11, wherein said second end regions of said first and second inner jacket tubes are additionally retained inside said outer jacket tube.

13. The catalytic converter according to claim 11, wherein said first and second inner jacket tubes are formed of ferritic sheet metal.

14. The catalytic converter according to claim 11, wherein said first and second inner jacket tubes are formed of perforated sheet metal.

15. The catalytic converter according to claim 11, wherein said first and second inner jacket tubes are formed of ferritic perforated sheet metal.

16. The catalytic converter according to claim 11, wherein said catalyst carrier bodies have different axial lengths.

17. The catalytic converter according to claim 11, wherein said catalyst carrier bodies have a different number of channels per unit of cross-sectional area.

18. The catalytic converter according to claim 11, wherein said catalyst carrier bodies have different axial lengths and a different number of channels per unit of cross-sectional area.

19. The catalytic converter according to claim 11, wherein said catalyst carrier bodies are spaced apart defining a space therebetween for making the exhaust gases turbulent and for compensating for longitudinal expansions.

20. The catalytic converter according to claim 19, wherein said first and second catalyst carrier bodies define an axial length of space between approximately 1 and 3 cm.

21. The catalytic converter according to claim 11, wherein said second end region of said first inner jacket tube has a taper protruding several millimeters into the interior of said second end region of said second inner jacket tube in a cold state.

22. The catalytic converter according to claim 11, wherein said outer jacket tube and said first and second inner jacket tubes are spaced apart by approximately 1 to 6 mm.

23. The catalytic converter according to claim 11, including connecting pieces slipped onto each of said first and second end regions of said outer jacket tube and joined to said outer jacket tube.

24. The catalytic converter according to claim 23, wherein said connecting pieces are joined to said outer jacket tube by butt-welding.

25. The catalytic converter according to claim 23, wherein one of said connecting pieces, said outer jacket tube and said at least one inner jacket tube are joined by a single continuous circumferential weld seam.

26. A catalytic converter, comprising:
a) first and second inner jacket tubes each having first and second end regions, and a metal honeycomb carrier body through which exhaust gas can flow received therein;
b) an outer jacket tube approximately concentrically surrounding said first and second inner jacket tubes and having first and second end regions;
c) said first end region of said first inner jacket tube being firmly joined to said first end region of said outer jacket tube;

d) said first end region of said second inner jacket tube being firmly joined to said second end region of said outer jacket tube; and e) at least one of said second end regions of said first and second inner jacket tubes being retained in said outer jacket tube with at least one sliding seat, and wherein said second end regions of said first and second inner jacket tubes are freely longitudinally expandable ends being guided one inside the other with a sliding seat.

27. The catalytic converter according to claim 26, wherein said outer jacket tube and said first and second inner jacket tubes are spaced apart by approximately 1 to 5 mm.

28. The catalytic converter according to claim 26, wherein said first and second inner jacket tubes are formed of ferritic sheet metal.

29. The catalytic converter according to claim 26, wherein said first and second inner jacket tubes are formed of perforated sheet metal.

30. The catalytic converter according to claim 26, wherein said first and second inner jacket tubes are formed of ferritic perforated sheet metal.

31. The catalytic converter according to claim 26, wherein said catalyst carrier bodies have different axial lengths.

32. The catalytic converter according to claim 26, wherein said catalyst carrier bodies have a different number of channels per unit of cross-sectional area.

33. The catalytic converter according to claim 26, wherein said catalyst carrier bodies have different axial lengths and a different number of channels per unit of cross-sectional area.

34. The catalytic converter according to claim 26, wherein said catalyst carrier bodies are spaced apart defining a space therebetween for making the exhaust gases turbulent and for compensating for longitudinal expansions.

35. The catalytic converter according to claim 34, wherein said first and second catalyst carrier bodies define an axial length of space between approximately 1 and 3 cm.

36. The catalytic converter according to claim 26, wherein said second end region of said first inner jacket tube has a taper protruding several millimeters into the interior of said second end region of said second inner jacket tube in a cold state.

37. The catalytic converter according to claim 26, including connecting pieces slipped onto each of said first and second end regions of said outer jacket tube and joined to said outer jacket tube.

38. The catalytic converter according to claim 26, wherein said connecting pieces are joined to said outer jacket tube by butt-welding.

39. The catalytic converter according to claim 37, wherein one of said connecting pieces, said outer jacket tube and said are joined by a single continuous circumferential weld seam. said

* * * * *